(12) United States Patent
Kim et al.

(10) Patent No.: US 9,389,126 B2
(45) Date of Patent: Jul. 12, 2016

(54) METHOD AND APPARATUS FOR LOW COST, HIGH ACCURACY TEMPERATURE SENSOR

(75) Inventors: Sejun Kim, Westford, MA (US); Khiem Quang Nguyen, Tewksbury, MA (US); Michael W. Determan, Brighton, MA (US); Robert Adams, Acton, MA (US)

(73) Assignee: Analog Devices, Inc., Norwood, MA (US)

( * ) Notice: Subject to any disclaimer, the term of this patent is extended or adjusted under 35 U.S.C. 154(b) by 953 days.

(21) Appl. No.: 13/399,611

(22) Filed: Feb. 17, 2012

(65) Prior Publication Data

US 2013/0218512 A1   Aug. 22, 2013

(51) Int. Cl.
*G01K 1/00* (2006.01)
*G01K 7/00* (2006.01)
*G06F 11/00* (2006.01)

(52) U.S. Cl.
CPC .............. *G01K 7/00* (2013.01); *G01K 2219/00* (2013.01)

(58) Field of Classification Search
CPC ................................................. G01K 2219/00
USPC ......................................................... 702/130
See application file for complete search history.

(56) References Cited

U.S. PATENT DOCUMENTS

| 5,539,672 | A | * | 7/1996 | Mullin et al. | 700/299 |
| 5,552,952 | A | * | 9/1996 | Kramer et al. | 361/86 |
| 7,674,035 | B2 | * | 3/2010 | Pertijs et al. | 374/1 |
| 2007/0252573 | A1 | * | 11/2007 | Tachibana et al. | 323/313 |
| 2010/0002747 | A1 | * | 1/2010 | Bosch et al. | 374/170 |

OTHER PUBLICATIONS

International Search Report and Written Opinion of the International Searching Authority in counterpart International Application No. PCT/US2013/026144, report dated Apr. 18, 2013.
D. Duarte, et al., "Temperature Sensor Design in High vol. Manufacturing 65nm CMOS Digital Process," IEEE Custom Integrated Circuits Conference, pp. 221-224, Sep. 2007.
Kyoungho Woo, et al., "Dual-DLL-Based CMOS All-Digital Temperature Sensor for Microprocessor Thermal Monitoring," ISSCC Digest of Technical Papers, pp. 68-69, Feb. 2009.
Y. William Li, et al., "A 1.05V 1.6mW 0.45° C. 3s-Resolution $\Delta\Sigma$-Based Temperature Sensor with Parasitic-Resistance Compensation in 32nm CMOS," ISSCC Digest of Technical Papers, pp. 340-341, Feb. 2009.
Andre L. Aita, et al., "A CMOS Smart Temperature Sensor with a Batch-Calibrated Inaccuracy of ±0.25° C. (3s) from-70° C. to 130° C.," ISSCC Digest of Technical Papers, pp. 342-343, Feb. 2009.

* cited by examiner

*Primary Examiner* — Phuong Huynh
(74) *Attorney, Agent, or Firm* — Schwegman Lundberg & Woessner, P.A.

(57) ABSTRACT

The invention may provide a temperature sensor device that includes an analog temperature sensor to generate a first base-emitter voltage and a second base-emitter voltage, and an analog-to-digital converter (ADC) to sample at the voltages and generate corresponding digital values. The temperature sensor device may also include a logic unit to calculate a digital temperature code from the digital values using a digital virtual reference.

22 Claims, 8 Drawing Sheets

100

200

300

600

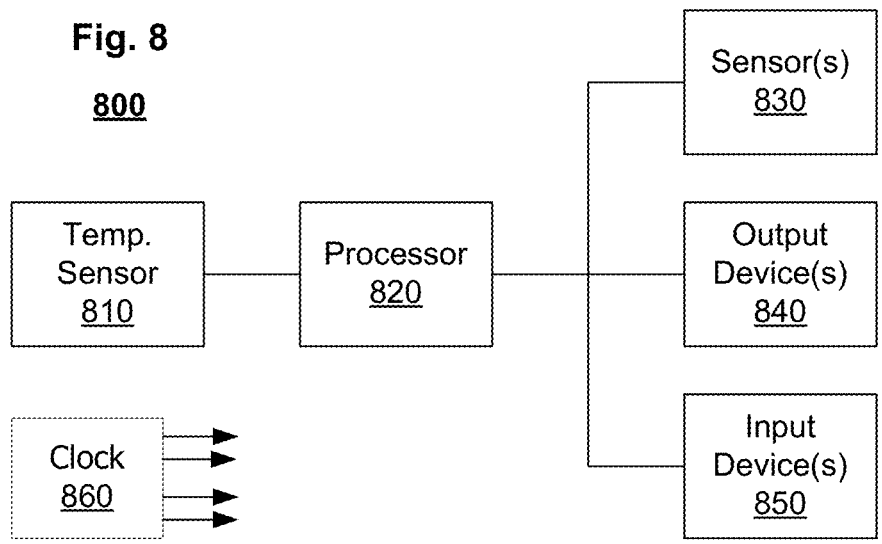

METHOD AND APPARATUS FOR LOW COST, HIGH ACCURACY TEMPERATURE SENSOR

BACKGROUND

The present invention relates to temperature sensors.

Generally, a temperature sensor is composed of analog circuitry where either an output voltage or current signal is generated that is proportional to ambient temperature. The analog circuitry's signal-to-temperature gain is typically very small (e.g., below a few mV). Therefore, induced offsets, either voltage or current, or component mismatch can result in substantial temperature sensor inaccuracies. Further, analog-to-digital conversion errors can add more inaccuracies to the temperature sensing process. For example, unstable reference voltages used in a analog-to-digital converter (ADC) can cause inaccurate variances such as gain errors in the temperature sensor results.

To mitigate these inaccuracies, conventional systems employ a post-trimming procedure on both the analog circuitry and the ADC reference voltage generator. The post-trimming procedure would test and tune each temperature sensor in a manufacturing lot individually. Thus, post-trimming significantly increases production costs by increasing testing time for multiple temperature testing and increasing additional wafer and die cost to implement post-trimming circuitry such as special electrical fuses. As a result, post-trimming restricts mass production capability and, consequently, temperature sensor integration.

Hence, the inventors recognized a need in the art for a low cost yet accurate temperature sensor.

BRIEF DESCRIPTION OF THE DRAWINGS

FIG. 8 is a simplified block diagram of an electronic device with an integrated temperature sensor according to an embodiment of the present invention.

DETAILED DESCRIPTION

Embodiments of the present invention may provide a temperature sensor device that includes an analog voltage generator to generate a first voltage and a second voltage that vary in proportion to ambient temperature, and an analog-to-digital converter (ADC) to sample the voltages and generate corresponding digital values using a reference voltage. The temperature sensor device may also include a logic unit to calculate ambient temperature from a comparison of the digital values, wherein the ambient temperature calculation is independent of reference voltage variations.

The temperature sensor device's use of a digital virtual reference to calculate the digital temperature code may provide an accurate temperature measurement that is independent of reference voltage variations in the ADC and associated inaccuracies. The reference voltage variations may not effect the digital temperature code because the variations will be cancelled out with the digital virtual reference use. Component mismatches may also be similarly cancelled out with the digital virtual reference use.

Figure 1:
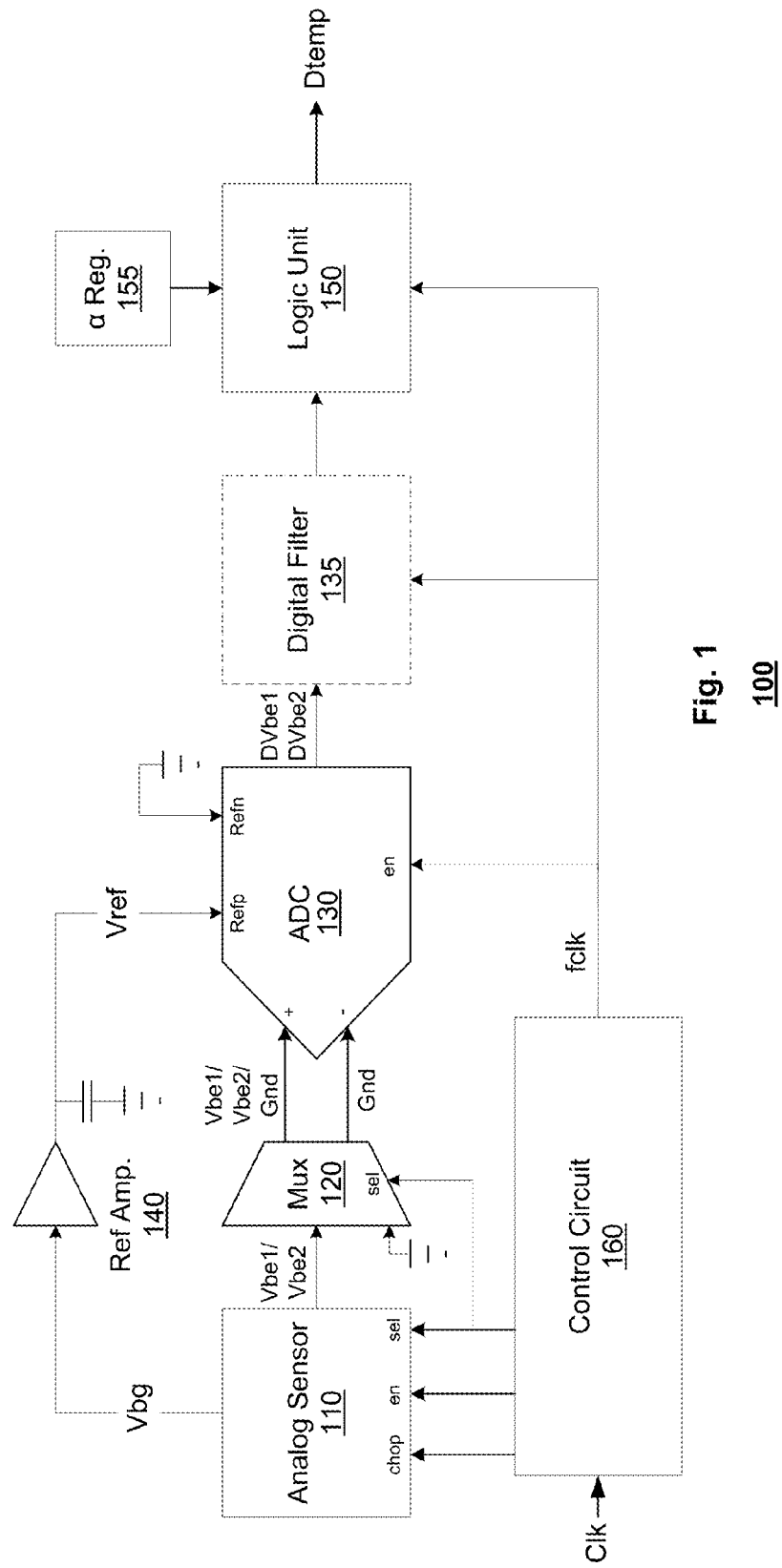
FIG. 1 is a simplified block diagram of a temperature sensor according to an embodiment of the present invention.

FIG. 1 is a block diagram of a temperature sensor 100 according to an embodiment of the present invention. The temperature sensor 100 may be provided, at least in part, by CMOS components. The temperature sensor 100 may include an analog sensor 110, a multiplexer 120, an ADC 130, a reference amplifier 140, a logic unit 150, an a register 155, and a control circuit 160.

The analog sensor 110 may generate two different base-emitter voltage signals Vbe1, Vbe2 sequentially (i.e., one at a time). The two base-emitter voltages Vbe1, Vbe2 may vary proportionally to ambient temperature and may have complementary-to-absolute temperature (CTAT) characteristics, meaning they increase with increasing temperature.

In an embodiment, the analog sensor 110 may be provided as a single substrate PNP BJT device with two different current densities. The analog sensor 110 operations, such as selection of the base-emitter voltages, chopping, and enabling (powering up/down), may be performed in accordance with respective control signals from the control circuit 160.

The control circuit 160 may control the operations of the temperature sensor 100 and its components. For example, the control circuit 160 may receive a clock signal Clk and provide timing signals to other components in the temperature sensor 100. The control circuit 160 may be provided as a microcontroller, a microprocessor, a state machine or the like.

The analog sensor 110 may output the base-emitter voltages Vbe1, Vbe2 to the multiplexer 120. The multiplexer 120 may also receive a ground input, Gnd. Based on a selection signal from the control circuit 160, the multiplexer 120 may transmit its received signals (e.g., Vbe1, Vbe2, Gnd) to the ADC 130.

The ADC 130 may digitize the input analog signals using a reference voltage Vref. In an embodiment, the reference voltage may be generated based on a band gap voltage Vbg generated by the analog sensor. The band gap voltage Vbg may be amplified by the reference amplifier 140 to generate the reference voltage Vref. Alternatively, the reference voltage may be provided from another supply source. Ordinarily Vref variations that are induced by temperature variations, for example, within the system might induce conversion errors in the ADC's output. Nonetheless, such conversion errors are mitigated by the temperature sensor 100 as explained below.

The ADC 130 may sample the input signals and generate corresponding digital values in respective conversion operations. For example, the ADC 130 may receive the Vbe1 signal at one terminal (e.g., positive terminal) and the Gnd signal at another terminal (e.g., negative terminal) to convert the Vbe1 signal. To convert the Vbe2 signal, for example, the ADC 130 may receive the Vbe2 signal at one terminal (e.g., positive terminal) and the Gnd signal at another terminal (e.g., negative terminal). Also, for possible offset correction, the ADC 130 may sample the Gnd signal by receiving the Gnd signal at both terminals. To generate digitized Vbe1 and Vbe2 signals with offset correction (DVbe1 and DVbe2), the sampled Gnd signal may be subtracted from the respective sampled Vbe1, Vbe2 signals.

The ADC 130 may be provided as a nyquist converter, an oversampling converter such as a sigma delta converter, a SAR (successive approximation register) converter, or other suitable ADC converter types. In an embodiment, for example, an oversampling converter embodiment, a digital filter 135 may also be provided following the ADC 130. The digital filter 135 may further refine the digital values by reducing noise components introduced in the digital values by the oversampling function.

The logic unit 150 may receive the digital values and an α value from the a register 155, which may be a programmable register. α may be a digital coefficient representing a scaling factor. α may be error tolerant and may be programmable. The logic unit 150 may be provided as an arithmetic logic unit or the like.

Based on its input values, the logic unit 150 may generate the digital temperature code using a digital virtual reference according to the equation:

$$Dtemp = \frac{\alpha*(DVeb2 - DVbe1)}{DVbe1 + \alpha*(DVbe2 - DVbe1)}$$

where Dtemp is the digital temperature code, a is the scaling factor, DVbe1 is the digitized first base-emitter voltage Vbe1, and DVbe2 is the digitized second base-emitter voltage Vbe2. The value DVbe1+α*(DVbe2−DVbe1) may be referred to as the digital virtual reference.

The digital temperature code Dtemp, as represented in the above equation, may be independent of the reference voltage and, consequently, has improved immunity to reference voltage variation errors. To further illustrate that the digital temperate code may be independent of the reference voltage, consider that the digitized base-emitter voltages may be represented by:

$$DVbe(x) = \frac{Vbe(x)}{Vref} - \frac{VGnd}{Vref}$$

where Vref is the reference voltage used by the ADC 130 for conversion, Vbe(x) represents the base-emitter voltage sampled by the ADC 130 (i.e., Vbe1/Vbe2 at positive terminal and Gnd at negative terminal), VGnd represents a ground input sampled by the ADC 130 (i.e., ground at both terminals). By subtracting VGnd from Vbe(x), possible ADC offset codes present in the ADC 130 may be nullified.

Based on the above equations, the digital temperature code may be expressed as:

$$Dtemp = \frac{\alpha*\left(\frac{Vbe2 - Vbe1}{Vref}\right)}{\frac{Vbe1 + \alpha*(Vbe2 - Vbe1)}{Vref}} = \frac{\alpha*(Vbe2 - Vbe1)}{Vbe1 + \alpha*(Vbe2 - Vbe1)}$$

Hence, Vref may be cancelled out in the digital temperature code calculation. Since the digital temperature code is independent of the reference voltage, embodiments of the present invention may provided improved immunity to PVT (process, voltage, temperature) errors associated with reference voltage variations. Since the temperature sensor 100 may be provided at least in part by CMOS components, the digital temperature code calculation according to embodiments of the present invention may provide an accurate temperature sensor without extra post-trimming.

Figure 2:
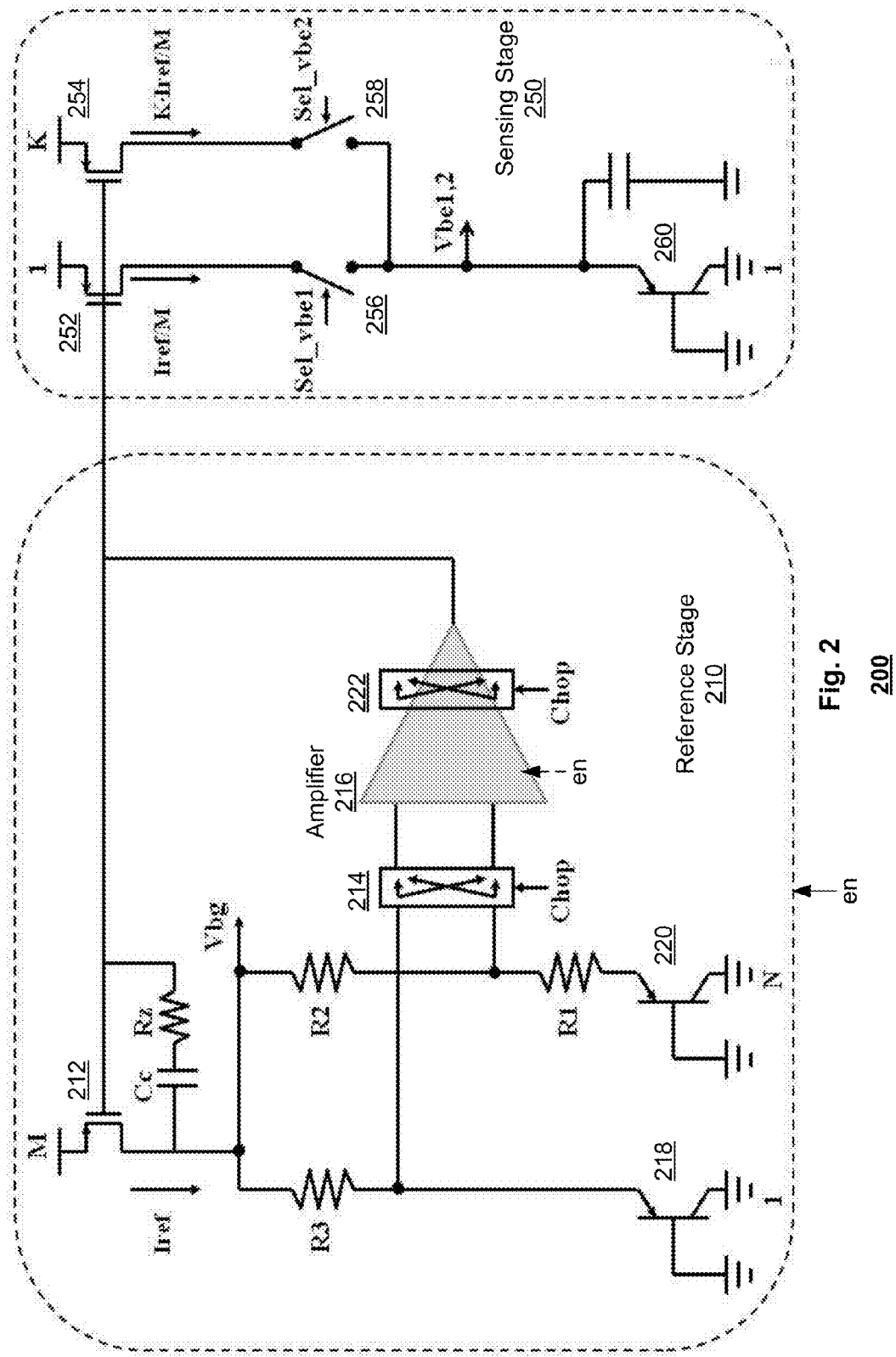
FIG. 2 is a simplified circuit diagram of an analog sensor according to an embodiment of the present invention.

FIG. 2 is a simplified circuit schematic of an analog sensor 200 according to an embodiment of the present invention. The analog sensor 200 may generate two base-emitter voltages that are proportional to ambient temperature sequentially (i.e., one at a time). The analog sensor 200 may include a reference stage 210 and a sensing stage 250. The reference stage 210 may generate a reference current and reference voltage. Based on the reference current and reference voltage, the sensing stage 250 may generate the pair of base-emitter voltages Vbe1, Vbe2 sequentially (i.e., one at a time).

The reference stage 210 may include a field effect transistor (FET) 212, a voltage resistor divider network (R1, R2, R3), a chop switch 214, an amplifier 216, and a pair of bipolar junction transistors (BJT) 218, 220. The FET 212 may generate a reference current Iref and a band gap voltage Vbg. The FET 212 may be coupled to an RC filter (Rz, Cc). The band gap voltage Vbg may be coupled to the chop switch 214 and the BJTs 218, 220 through the resistor divider network R1, R2, and R3. The chop switch 214 may be a cross-connect switch that changes connections from the resistor divider network to the amplifier 216 in a first period and a second period respectively. In an embodiment, the amplifier 216 may also include a second chop switch 222 that works in conjunction with the first chop switch 222 to cross-connect internal amplifier connections, shown in FIG. 3. By changing the directions of the chop switch(es) and averaging the results, offset errors may be reduced.

Figure 3:
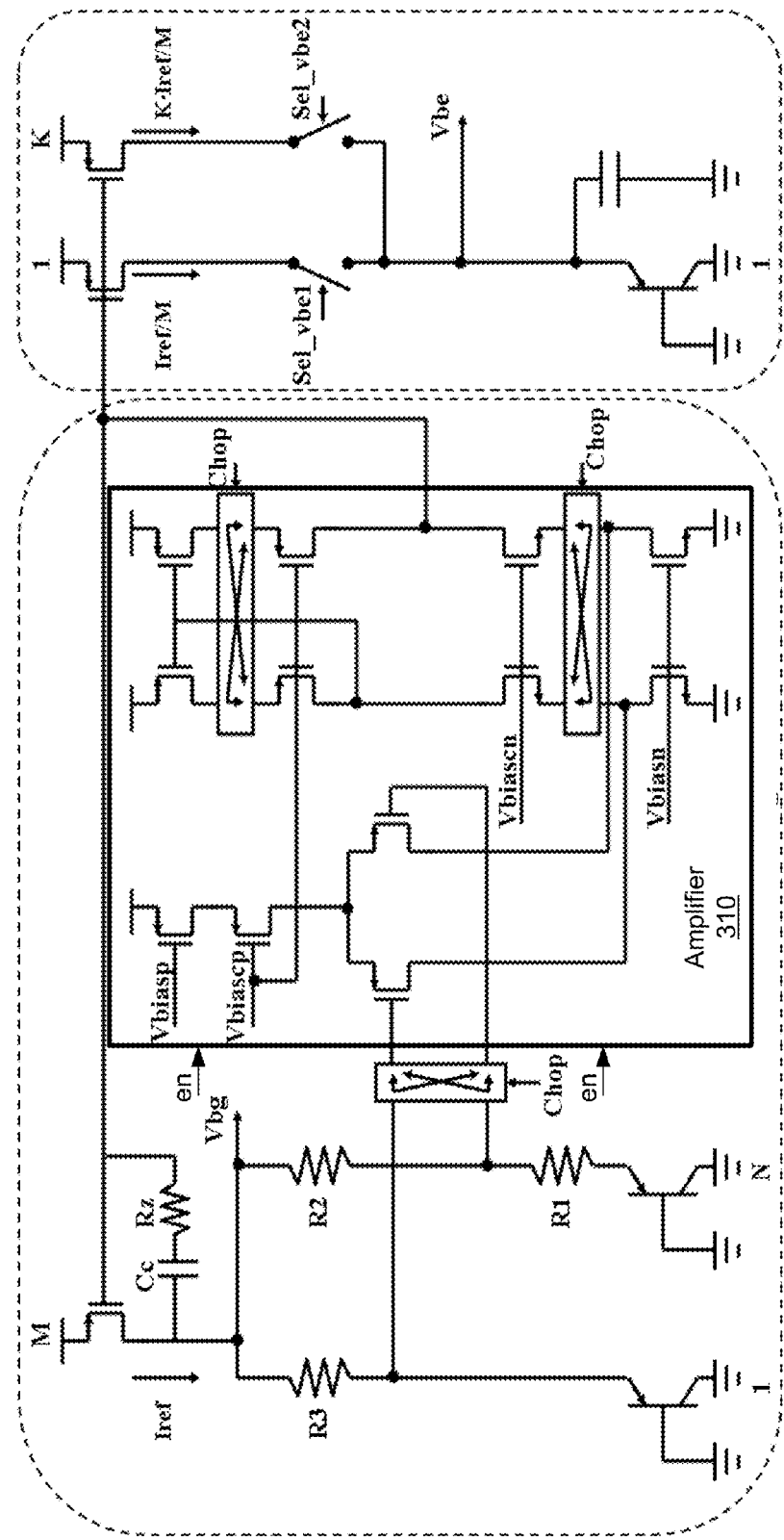
FIG. 3 is a simplified circuit diagram of an analog sensor according to an embodiment of the present invention.

The amplifier 216 may be a feedback amplifier. In an embodiment, the amplifier 216 may be provided as a cascode opamp or other suitable amplifier structures. FIG. 3 is a simplified circuit schematic of an analog sensor 300 with a cascode op-amp 310 according to an embodiment of the present invention.

Returning to FIG. 2, the sensing stage 250 may include two FETs 252, 254; two switches 256, 258; and a BJT 260. The FETs 252, 254 may be coupled to an output of the reference stage 210, in particular to an output of the amplifier 216. The switches 256, 258 may be turned on/off one at a time in alternate fashion responsive to control signals Sel_vbe1 and Sel_vbe2. When switch 256 is closed and switch 258 is open, FET 252 may be coupled to the emitter node of BJT 260 and may generate the first base-emitter voltage Vbe1. When switch 258 is closed and switch 256 is open, FET 254 may be coupled to the emitter node of BJT 260 and may generate the second base-emitter voltage Vbe2. Hence, the sensing stage 250 may generate the pair of base-emitter voltages Vbe1, Vbe2 sequentially. Further, the pair of base-emitter voltages Vbe1, Vbe2 may be proportional (linearly or conversely) to ambient temperature because the sensing stage 250 functionality varies based on temperature. As discussed, the two base-emitter voltages Vbe1, Vbe2 may vary in CTAT fashion.

Relative sizes of the FETs 252, 254 may be chosen to generate scale currents through the respective transistors in response to a common input signal. Thus during a time that Sel_vbe2 is active, FET 254 may generate a current through BJT 260 that is K times larger than the current induced by FET 252 when Sel_vbe1 is active. The scaled currents induce different values in Vbe1 and Vbe2 outputs. The scaling factors M, K, and N may be optimized based on the CMOS component characteristics. For example, the M value choice may balance settling time and linearity properties. The K value choice may balance the ADC's dynamic range (resolution) and mismatch errors. The N value may balance offset and non-linearity errors.

Figure 4:
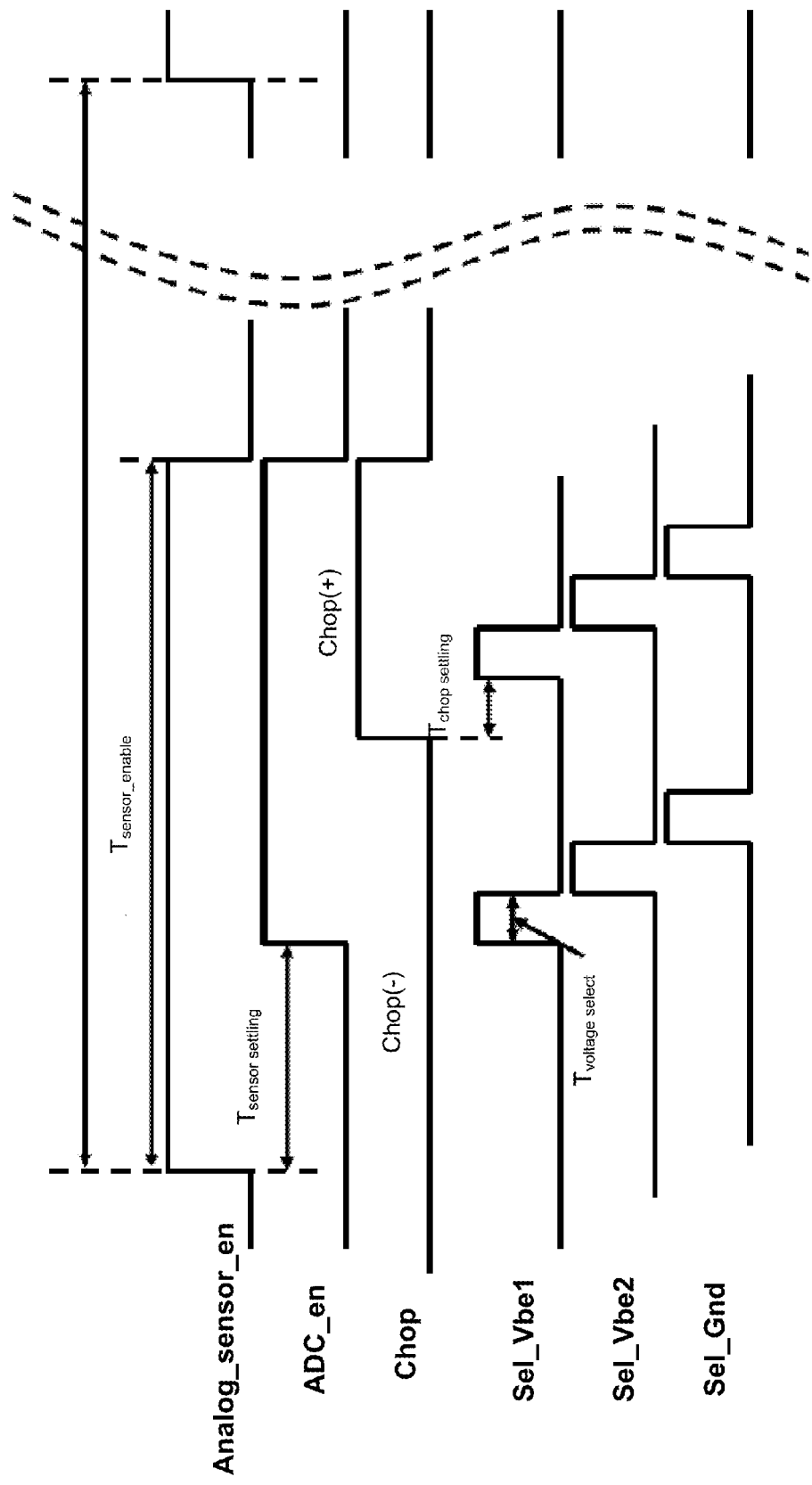
FIG. 4 is a timing diagram of temperature sensor operations according to an embodiment of the present invention.

FIG. 4 illustrates a timing diagram of a temperature sensor device operations according to an embodiment of the present invention. Analog_sensor_en may be a control signal enabling the analog sensor. ADC_en may be a control signal enabling the ADC. Chop may be a control signal switching the connection directions of the chop switch(es). Sel_Vbe1 may a selection signal to connect Vbe1 to one terminal of the ADC (the other terminal to Gnd). Sel_Vbe2 may be a selection signal to connect Vbe2 to one terminal of the ADC (the other terminal to Gnd). Sel_Gnd may be a selection signal to connect both terminals of the ADC to Gnd via the multiplexer.

Initially, the analog sensor may be enabled for length of time $T_{sensor\ enable}$. After a sensor settling time $T_{sensor\ settling}$ to stabilize the band gap voltage Vbg, the ADC may be enabled when ADC_en goes high. The bang gap voltage may also be used as a reference voltage in some form by the ADC. With the ADC enabled, the pair of base emitter voltages Vbe1, Vbe2 and the reference ground signal may be generated by the analog sensor, outputted by the multiplexer, and sampled by the ADC sequentially as controlled by the selection signals Sel_Vbe1, Sel_Vbe2, and Sel_Gnd. For example, Vbe1 may generated and sampled first, then Vbe2 may be generated and sampled second, and the reference ground signal may generated and sampled third.

The digital temperature code may be generated from these values, as described above, using the digital virtual reference according to the equation:

$$Dtemp = \frac{\alpha * (DVbe2 - DVbe1)}{DVbe1 + \alpha * (DVbe2 - DVbe1)}$$

where Dtemp is the digital temperature code, a is the scaling factor, DVbe1 is the digitized first base-emitter voltage Vbe1, and DVbe2 is the digitized second base-emitter voltage Vbe2. The digitized base-emitter voltages may be generated according to:

$$DVbe(x) = \frac{Vbe(x)}{Vref} - \frac{VGnd}{Vref}$$

where Vref is the reference voltage used by the ADC 130 for conversion, Vbe(x) represents the base-emitter voltage sampled by the ADC 130 (i.e., Vbe1/Vbe2 at positive terminal and Gnd at negative terminal), VGnd represents a ground input sampled by the ADC 130 (i.e., ground at both terminals). By subtracting VGnd from Vbe(x), possible ADC offset codes present in the ADC 130 may be nullified.

In an embodiment of the present invention, an offset error in the analog sensor may also be reduced and/or eliminated. The digital temperature code generation may be repeated while changing direction of the chopping switches in the analog sensor. For example, the pair of base emitter voltages Vbe1, Vbe2 and the reference ground signal may be generated by the analog sensor, outputted by the multiplexer, and sampled by the ADC in a first set. During the first set, the chop signal may be set to one polarity (e.g., Chop(−)). The digital temperature code may be generated from these first set values represented by Dtemp_chop(−). Next, the pair of base emitter voltages Vbe1, Vbe2 and the reference ground signal may be generated by the analog sensor, outputted by the multiplexer, and sampled by the ADC in a second set. During the first set, the chop signal may be set to a second polarity (e.g., Chop (+)). The digital temperature code may be generated from these second set values represented by Dtemp_chop(+). An average of the digital temperature codes with each chop direction may be performed, expressed as:

$$Dtemp\_avg = \frac{Dtemp\_chop(-) + Dtemp\_chop(+)}{2}$$

By averaging the digital temperature codes generated in each chop direction, the offset error in the analog sensor may be reduced and/or eliminated.

Figure 5:
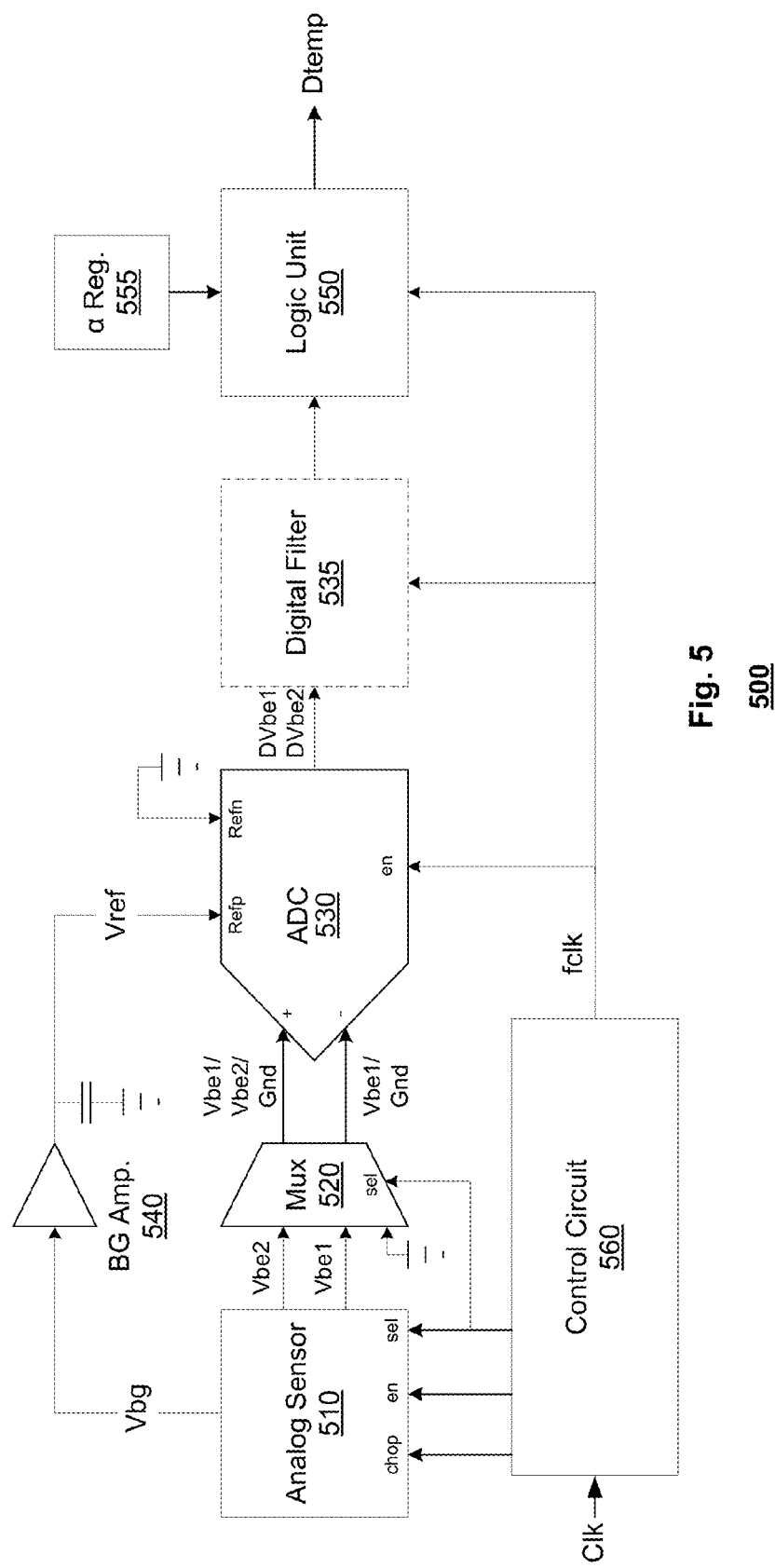
FIG. 5 is a simplified block diagram of a temperature sensor according to an embodiment of the present invention.

In another embodiment of the present invention, the pair of base-emitter voltages Vbe1, Vbe2 may be generated simultaneously rather than sequentially. FIG. 5 is a block diagram of a temperature sensor 500 according to an embodiment of the present invention. The temperature sensor 100 may include an analog sensor 510, a multiplexer 520, an ADC 530, a reference amplifier 540, a logic unit 550, an a register 555, and a control circuit 560.

The analog sensor 510 may generate two different voltage signals that vary proportionally to ambient temperature simultaneously, and the two voltage signals may be two different base-emitter voltages Vbe1, Vbe2. Hence, the analog sensor 510 may have two output lines, one for each generated voltage signal. The two base-emitter voltages Vbe1, Vbe2 may be have CTAT characteristics, meaning that they increase with increasing temperature.

In an embodiment, the analog sensor 510 may be provided as a single substrate PNP BJT device with two different current densities. The analog sensor 510 operations, such as selection of the base-emitter voltages, chopping, and enabling (powering up/down), may be performed in accordance with respective control signals from the control circuit 560.

The control circuit 560 may control the operations of the temperature sensor 100 and its components. For example, the control circuit 560 may receive a clock signal Clk and provide timing signals to other components in the temperature sensor 500. The control circuit 560 may be provided as a microcontroller, a microprocessor, a state machine or the like.

The analog sensor 510 may output the base-emitter voltages Vbe1, Vbe2 simultaneously to the multiplexer 120. The multiplexer 120 may also receive a ground input, Gnd. Based on a selection signal from the control circuit 160, the multiplexer 120 may transmit its received signals (e.g., Vbe1, Vbe2, Gnd) to the ADC 130.

The ADC 530 may sample the signals and generate corresponding digital values. The ADC 530 may digitize the analog signals based on a reference voltage. In an embodiment, the reference voltage may be generated based on a band gap voltage Vbg generated by the analog sensor. The band gap voltage Vbg may be amplified by the reference amplifier 540 to generate the reference voltage. Alternatively, the reference voltage may be provided from another supply source. As described herein, digital temperature code calculation according to embodiments of the present invention may be independent of the reference voltage.

Since the base-emitter voltages may be generated simultaneously, the ADC 530 may sample the difference between the two base-emitter voltages directly. For example, the ADC 530 may receive the Vbe2 signal at one terminal (e.g., positive terminal) and the Vbe1 at another terminal (e.g., negative terminal) to digitize a difference of the base-emitter voltages, Vbe2−Vbe1. The ADC 530 may also sample Vbe1 and Gnd as described above.

The ADC 530 may be provided as a nyquist converter, an oversampling converter such as a sigma delta converter, a SAR (successive approximation register) converter, or other suitable ADC converter types. In an embodiment, for example an oversampling converter embodiment, a digital filter 535 may also be provided following the ADC 530. The digital filter 535 may further refine the digital values by reducing noise components introduced in the digital values by the oversampling function.

The logic unit 550 may receive the digital values and an α value from the a register 555, which may be a programmable register. α may be a digital coefficient representing a scaling factor. α may be error tolerant and may be programmable. The logic unit 550 may be provided as an arithmetic logic unit or the like.

Based on its input values, the logic unit 550 may generate the digital temperature code using a digital virtual reference according to the equation:

$$Dtemp = \frac{\alpha * (DVbe2 - DVbe1)}{DVbe1 + \alpha * (DVbe2 - DVbe1)}$$

where Dtemp is the digital temperature code, α is a scaling factor, DVbe1 is the digitized first base-emitter voltage Vbe1, and DVbe2 is the digitized second base-emitter voltage Vbe2. The value DVbe1+α*(DVbe2−DVbe1) may be referred to as the digital virtual reference. The digitized base-emitter voltages may be generated according to:

$$DVbe(x) = \frac{Vbe(x)}{Vref} - \frac{VGnd}{Vref}$$

where Vref is the reference voltage used by the ADC 130 for conversion, Vbe(x) represents the base-emitter voltage sampled by the ADC 130 (i.e., Vbe1/Vbe2 at positive terminal and Gnd at negative terminal), VGnd represents a ground input sampled by the ADC 130 (i.e., ground at both terminals). By subtracting VGnd from Vbe(x), possible ADC offset codes present in the ADC 130 may be nullified.

Figure 6:
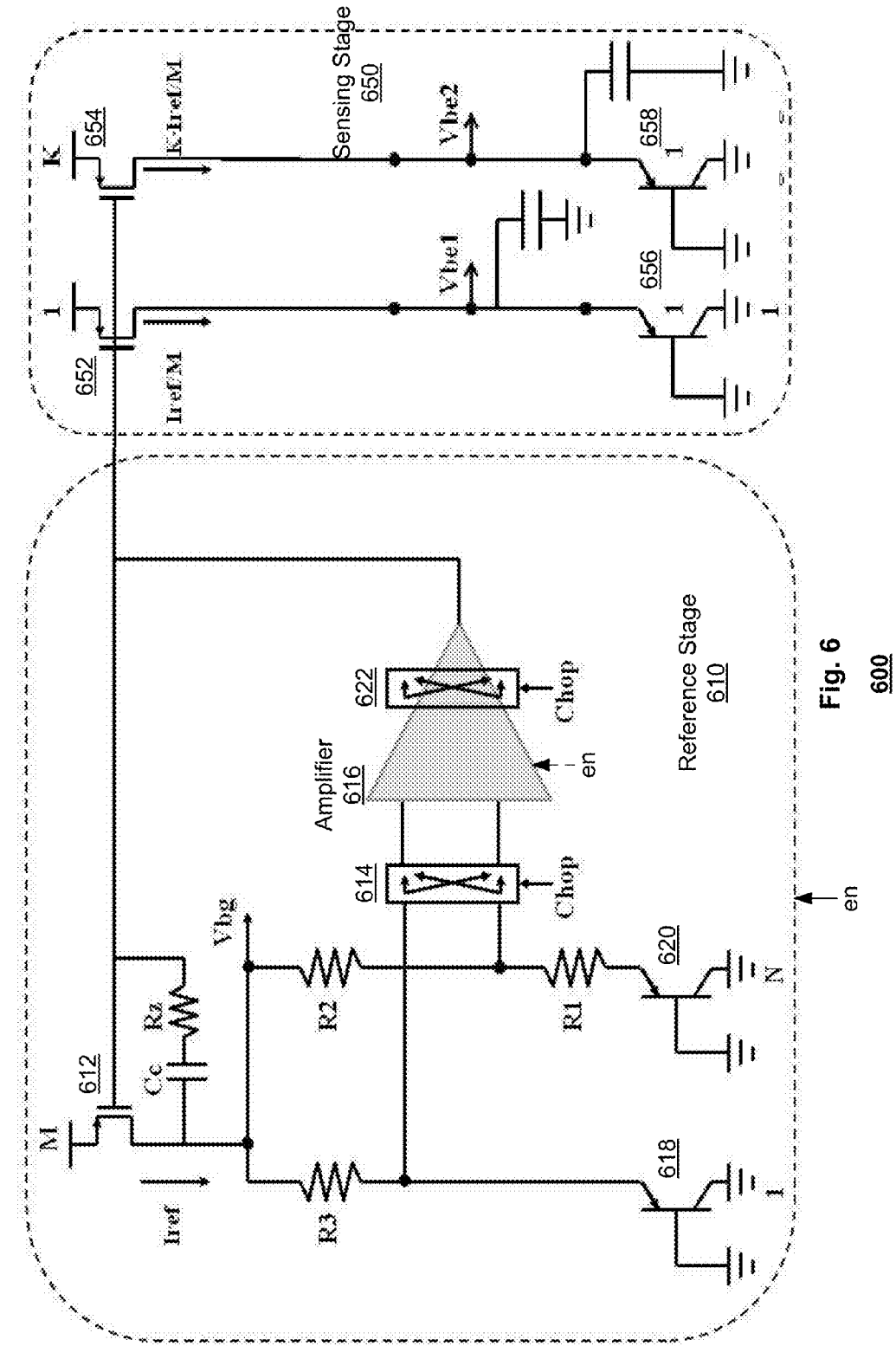
FIG. 6 is a simplified circuit diagram of an analog sensor according to an embodiment of the present invention.

FIG. 6 is a simplified circuit schematic of an analog sensor 600 according to an embodiment of the present invention. The analog sensor 600 may generate two base-emitter voltages that are proportional to ambient temperature substantially simultaneously (i.e., at the same time). The analog sensor 600 may include a reference stage 610 and a sensing stage 650. The reference stage 610 may generate a reference current and reference voltage. Based on the reference current and reference voltage, the sensing stage 650 may generate the pair of base-emitter voltages Vbe1, Vbe2 simultaneously.

The reference stage 610 may include a FET 612, a voltage resistor divider network (R1, R2, R3), a chop switch 614, an amplifier 616, and a pair of BJTs 618, 620. The FET 612 may generate a reference current Iref and a band gap voltage Vbg. The FET 612 may be coupled to an RC filter (Rz, Cc). The band gap voltage Vbg may be coupled to the chop switch 614 and the BJTs 618, 620 through the resistor divider network R1, R2, and R3. The chop switch 614 may be a cross-connect switch that changes connections from the resistor divider network to the amplifier 616 in a first period and a second period respectively. In an embodiment, the amplifier 616 may also include a second chop switch 622 that works in conjunction with the first chop switch 622 to cross-connect internal amplifier connections, shown in FIG. 3. By changing the directions of the chop switch(es) and averaging the results, offset errors may be reduced.

The amplifier 616 may be a feedback amplifier. For example, the amplifier 616 may be provided as a cascode opamp or other suitable amplifier structure.

The sensing stage 650 may include two FETs 652, 654 and two BJTs 656, 658. The FETs 652, 654 may be coupled to an output of the reference stage 610, in particular to an output of the amplifier 616. The FET 652 may be coupled to the emitter node of BJT 656 to generate the first base-emitter voltage Vbe1. The FET 654 may be coupled to the emitter node of BJT 658 to generate the second base-emitter voltage Vbe2. Hence, the pair of base-emitter voltages may be generated simultaneously.

Figure 7:
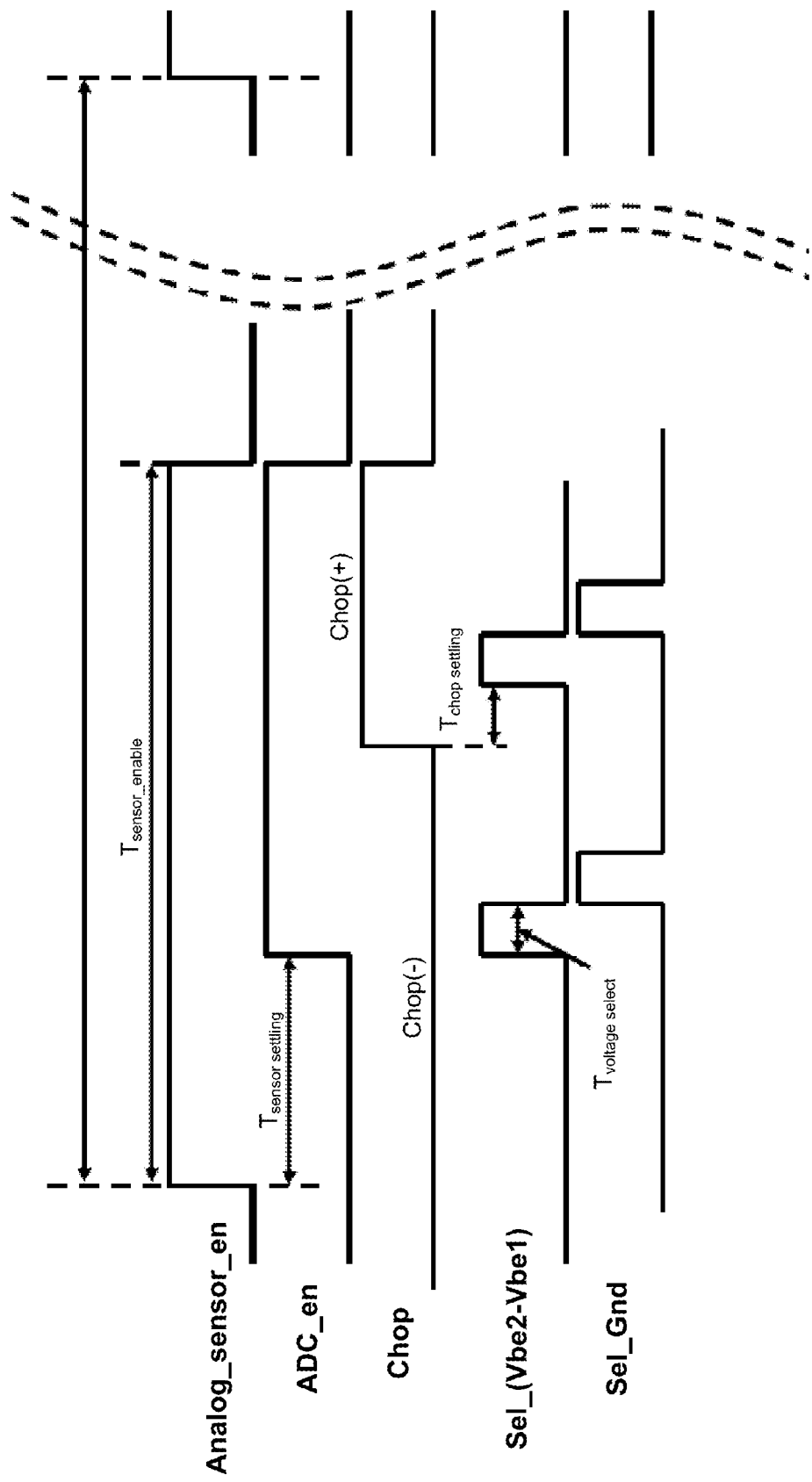
FIG. 7 is a timing diagram of temperature sensor operations according to an embodiment of the present invention.

FIG. 7 illustrates a timing diagram of a temperature sensor device operations according to an embodiment of the present invention. Analog_sensor_en may be a control signal enabling the analog sensor. ADC_en may be a control signal enabling the ADC. Chop may be a control signal switching the connection directions of the chop switch(es). Sel_(Vbe2−Vbe1) may a selection signal to connect Vbe2 to one terminal (e.g., positive terminal) and Vbe1 to another terminal (e.g., negative terminal) of the ADC. Sel_Gnd may be a selection signal to connect both terminals of the ADC to Gnd.

Initially, the analog sensor (BJT sensor) may be enabled for length of time Tsensor enable. After a sensor settling time Tsensor settling to stabilize the band gap voltage Vbg, the ADC may be enabled. The bang gap voltage may also be used as a reference voltage in some form by the ADC. With the ADC enabled, the pair of base emitter voltages Vbe1, Vbe2 and the reference ground signal may be generated by the analog sensor, outputted by the multiplexer, and sampled by the ADC. For example, since the pair of emitter voltages may be generated simultaneously, the difference of the base-emitter voltages Vbe2−Vbe1 may be directly sampled by coupling one terminal of the ADC to Vbe2 and the other terminal of the ADC to Vbe1.

The digital temperature code may be generated from these values, as described above, using the digital virtual reference according to the equation:

$$Dtemp = \frac{\alpha * (DVbe2 - DVbe1)}{DVbe1 + \alpha * (DVbe2 - DVbe1)}$$

where Dtemp is the digital temperature code, a is the scaling factor, DVbe1 is the digitized first base-emitter voltage Vbe1, and DVbe2 is the digitized second base-emitter voltage Vbe2. The digitized base-emitter voltages may be generated according to:

$$DVbe(x) = \frac{Vbe(x)}{Vref} - \frac{VGnd}{Vref}$$

where Vref is the reference voltage used by the ADC 130 for conversion, Vbe(x) represents the base-emitter voltage sampled by the ADC 130 (i.e., Vbe1/Vbe2 at positive terminal and Gnd at negative terminal), VGnd represents a ground input sampled by the ADC 130 (i.e., ground at both terminals).

Temperature sensor embodiments described herein may be integrated into larger electronic devices where temperature measurements may improve the electronic device functionality. For example, a temperature sensor according to embodiments described herein may be integrated into a cellular phone, an automobile control panel and audio system, a drilling apparatus, a lens driver, a PC system (thermal chip-level management), etc.

FIG. 8 is a block diagram of an electronic device 800 with an integrated temperature sensor according to an embodiment of the present invention. The electronic device 800 may include a temperature sensor 810, a processor 820, other sensor(s) 830, output device(s) 840, input device(s) 850, and a clock 860 to provide timing signals for the device 800 components.

The temperature sensor 810 may be provided according to the various embodiments described herein and may generate a digital temperature code according to the various embodiments disclosed herein. The processor 820 may be a microprocessor, microcontroller, state machine, or the like. The processor 820 may receive a calculated digital temperature code from the temperature sensor 810 and may adjust the operations of the device 800 according to the temperature code.

In an embodiment, the device 800 may adjust other sensor readings (e.g., from sensor(s) 830) based on the measured temperature. For example, the sensor(s) 830 may include a position sensor, and the position sensor components may be susceptible to variations associated with temperature changes. The processor 820 may adjust the sensor(s) 830 readings based on temperature measurements provided by the temperature sensor 810 and, therefore, improve accuracy of the sensor(s) 830 readings.

In an embodiment, the device 830 may adjust output device(s) operations based on the measured temperature. For example, the output device(s) 840 may include a coolant device such as a fan that operates based on the ambient temperature. The processor 820 may control the output device(s) 840 operations based on temperature measurements provided by the temperature sensor 810 and, therefore, may improve output device(s) 840 operations.

In an embodiment, the device 830 may adjust input device(s) inputs based on the measured temperature. For example, the input device(s) 840 may include a touch screen interface, and the interface's sensitivity may be susceptible to temperature variation associated errors. The processor 820 may adjust the input device(s) 820 based on temperature measurements provided by the temperature sensor 810 and, therefore, improve input device(s) 850 operations.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disc Read Only Memory (CD-ROM), Compact Disc Recordable (CD-R), Compact Disc Rewriteable (CD-RW), optical disk, magnetic media, magneto-optical media, removable memory cards or disks, various types of Digital Versatile Disc (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

We claim:

1. A temperature sensor device, comprising:
   an analog voltage generator to generate a first voltage and a second voltage that vary in proportion to ambient temperature;
   an analog-to-digital converter (ADC) to sample the voltages and generate corresponding digital values using a reference voltage; and
   a logic unit to calculate ambient temperature from a comparison of the digital values by dividing a difference of the digital values by a digital virtual reference, which includes the sum of the difference of the digital values and one of the digital values, to cancel out reliance on the reference voltage in the ambient temperature calculation, wherein the ambient temperature calculation is independent of reference voltage variations.

2. The temperature sensor device of claim 1, wherein the first voltage is a first base-emitter voltage and the second voltage is a second base-emitter voltage, wherein the logic unit calculates the digital temperature code according to:

$$Dtemp = \frac{\alpha * (DVbe2 - DVbe1)}{DVbe1 + \alpha * (DVbe2 - DVbe1)},$$

where Dtemp is the digital temperature code, $\alpha$ is a scaling factor, DVbe1 is a first digitized base-emitter voltage, DVbe2 is a second digitized base-emitter voltage, and DVbe1+$\alpha$*(DVbe2−DVbe1) is the digital virtual reference.

3. The temperature sensor device of claim 2, wherein $$DVbe1 = \frac{Vbe1}{Vref} - \frac{VGnd}{Vref}$$

and $$DVbe2 = \frac{Vbe2}{Vref} - \frac{VGnd}{Vref},$$

where Vbe1 is the first base-emitter voltage, Vbe2 is the second base-emitter voltage, VGnd is a ground voltage, and Vref is the reference voltage.

4. The temperature sensor device of claim 1, wherein the analog voltage generator includes a reference stage and a sensing stage.

5. The temperature sensor device of claim 4, wherein the reference stage includes a chop circuit with a cross connect switch.

6. The temperature sensor device of claim 4, wherein the reference stage generates a band gap reference voltage, wherein reference voltage is based on the band gap reference.

7. The temperature sensor device of claim 4, wherein the sensing stage comprises a single bipolar junction transistor.

8. The temperature sensor device of claim 4, wherein the sensing stage comprises a pair of bipolar junction transistors.

9. The temperature sensor device of claim 1, wherein the analog-to-digital converter is an oversampling analog-to-digital converter, and further comprises a digital filter.

10. The temperature sensor device of claim 1, further comprises a multiplexer.

11. A method comprising:
generating a pair of voltages, the voltages corresponding to absolute temperature measurements;
digitizing, by an analog-to-digital converter, the voltages to generate digital samples using a reference voltage to generate a first and second digital value;
calculating ambient temperature based on the digital samples by dividing a difference of the first and second digital values by a digital virtual reference, which includes the sum of the difference of the digital values and one of the digital values, wherein the calculation of the ambient temperature is independent of reference voltage variations; and
adjusting control of a component based on the calculated ambient temperature.

12. The method of claim 11, wherein the voltages are base-emitter voltages and wherein the calculating is according to:

$$Dtemp = \frac{\alpha*(DVbe2 - DVbe1)}{DVbe1 + \alpha*(DVbe2 - DVbe1)},$$

where Dtemp is the digital temperature code, α is a scaling factor, DVbe1 is a first digitized base-emitter voltage, DVbe2 is a second digitized base-emitter voltage, and DVbe1+α*(DVbe2−DVbe1) is the digital virtual reference.

13. The method of claim 12, wherein $$DVbe1 = \frac{Vbe1}{Vref} - \frac{VGnd}{Vref}$$

and $$DVbe2 = \frac{Vbe2}{Vref} - \frac{VGnd}{Vref},$$

where Vbe1 is the first base-emitter voltage, Vbe2 is the second base-emitter voltage, VGnd is a ground voltage, and Vref is the reference voltage.

14. The method of claim 11, wherein the pair of voltages are generated sequentially.

15. The method of claim 11, wherein the pair of voltages are generated simultaneously.

16. The method of claim 11, further comprises filtering the digital samples.

17. The method of claim 11, further comprises generating a band-gap voltage and wherein the reference voltage is based on the band-gap voltage.

18. The method of claim 11, further comprises canceling an offset error generated in the digitizing by switching directions of chopping switches and averaging results of the digital temperature code in each switch direction together.

19. An electronic device, comprising:
a temperature measurement system comprising,
  an analog sensor to generate a first voltage and a second voltage that vary in proportion to ambient temperature,
  an analog-to-digital converter (ADC) to sample the voltages and generate corresponding digital values using a reference voltage,
  a logic unit to calculate ambient temperature from a comparison of the digital values by dividing a difference of the digital values by a digital virtual reference, which includes the sum of the difference of the digital values and one of the digital values, to cancel out reliance on the reference voltage in the ambient temperature calculation, wherein the ambient temperature calculation is independent of reference voltage variations;
a component, and
a processor to receive to the ambient temperature calculation and adjust an operation of the component in response.

20. The electronic device of claim 19, wherein the first voltage is a first base-emitter voltage and the second voltage is a second base-emitter voltage, wherein the logic unit calculates the digital temperature code according to:

$$Dtemp = \frac{\alpha*(DVbe2 - DVbe1)}{DVbe1 + \alpha*(DVbe2 - DVbe1)},$$

where Dtemp is the digital temperature code, α is a scaling factor, DVbe1 is a first digitized base-emitter voltage, DVbe2 is a second digitized base-emitter voltage, and DVbe1+α*(DVbe2−DVbe1) is the digital virtual reference, wherein $$DVbe1 = \frac{Vbe1}{Vref} - \frac{VGnd}{Vref}$$

and $$DVbe2 = \frac{Vbe2}{Vref} - \frac{VGnd}{Vref},$$

where Vbe1 is the first base-emitter voltage, Vbe2 is the second base-emitter voltage, VGnd is a ground voltage, and Vref is the reference voltage.

21. The electronic device of claim 19, wherein the component is a sensor device.

22. The electronic device of claim 19, wherein the component is an output device.

* * * * *